Jan. 6, 1931.  M. E. GATES  1,788,101
MOLD AND METHOD OF MANUFACTURING THE SAME
Filed July 19, 1928
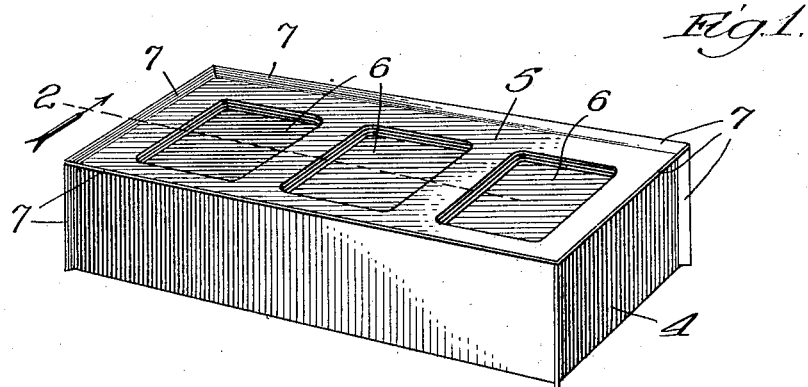
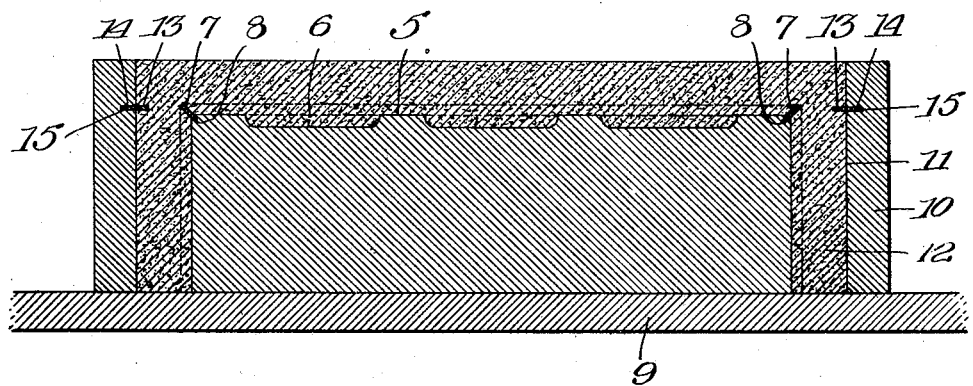
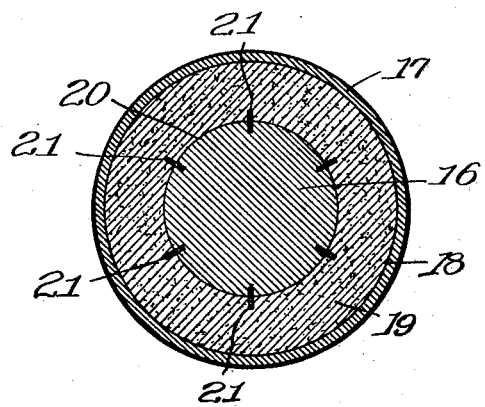

Patented Jan. 6, 1931

1,788,101

UNITED STATES PATENT OFFICE

MAJOR E. GATES, OF CRYSTAL LAKE, ILLINOIS

MOLD AND METHOD OF MANUFACTURING THE SAME

Application filed July 19, 1928. Serial No. 293,904.

My invention relates more particularly to the manufacture of molds of comparatively fragile material, as for example plaster of Paris, formed about patterns of such form that the pattern and the mold, the latter as a unit, cannot be separated, but requires that the mold be displaced from the pattern in sections, my invention relating particularly, though not exclusively, to the molding of clay blocks, or the like, as for example terra cotta blocks.

In connection with the manufacture of building blocks, as for example of terra cotta, the common practice, is to make the mold, usually of plaster of Paris, in separate, separable, sections to permit of the separation of the mold from the pattern, the sections being thereafter reassembled to form the mold in which the blocks are to be molded, this practice presenting objections, one of which is that the production of blocks in this way is relatively expensive and the operation is a comparatively slow one.

My primary object is to greatly reduce the cost of manufacture of such articles and to reduce the time necessary for producing any given number of the articles.

Generally stated my invention consists in molding about the pattern a settable material which is comparatively fragile when set, such as plaster of Paris, the molded material being provided as an integral mass and providing for the weakening of the mass of molded material at such a portion, or portions, thereof, that the molded mass upon the application of fracturing stresses thereto, will fracture along such a line, or lines, that the mold may be separated freely in sections from the pattern.

Referring to the accompanying drawings:—

Figures 1 and 2 relate to the production of a mold in which substantially rectangular objects, such as terra cotta building blocks, are molded; and Figure 3, to a structure in which cylindrical blocks, as for example, blocks for the forming of a column, are to be molded, Fig. 1 being a perspective view of a pattern of a building block shown as equipped with means whereby the mold structure to be produced will be fractured, upon applying fracturing stresses thereto, along the desired lines. Figure 2 is a view in sectional elevation of the mold structure as cast about the pattern; and Figure 3, a plan sectional view of the mold structure for the cylindrical blocks, as cast about the pattern therefor.

Referring first to the construction of molds for buildnig blocks in accordance with Figs. 1 and 2 of the drawings, a pattern about which the mold is to be cast for the forming of a mold having a mold cavity for molding blocks like the pattern, is represented at 4, the face 5 of the pattern, by way of example being shown as containing a series of depressions 6.

The pattern 4 is shown as provided at its substantially vertical corners and about the four marginal edges of its face portion 5 with strips 7 of any suitable material, as for example metal, secured to the pattern in any desirable way, as for example by fitting them into grooves in the pattern at the portions referred to, these grooves along the ends of the face 5 of the pattern being represented at 8, the strips 7 being disposed preferably at substantially 45° to the adjacent sides of the pattern, as shown.

In the forming of the mold the pattern 4 is laid upon a table 9 with its face portion 5 uppermost and a rectangular mold frame 10 placed upon the table to surround the pattern but in spaced relationship to all four side walls of the latter to provide a rectangular shaped mold-space 11 between the pattern 4 and the frame 10, which latter extends upwardly a short distance beyond the face 5 of the pattern. The material, such as fluid plaster of Paris, and from which the mold, represented at 12, is to be formed, is then poured into the mold-space 11 to fill this space as shown in Fig. 2, the projecting portions of the strip 7 becoming embedded in the mold 12.

After the molded material has set, the side walls of the frame 10, which may, if desired, be formed of separable sections, are then removed from the mold 12 and the operator, by any suitable tool, as for example, a chisel, applies force to the mold 12, thus formed, to subject it to fracturing stresses adjacent the strips 7 the embedment of which latter in the mold 12 causes the material of which the mold is formed to be weakened at these strips and thus the mold fractures along the corners of the pattern 4 at which these strips are located thereby causing the mold 12 to be reduced from an integral structure into five separate pieces permitting of the free separation thereof from the pattern and the reassembling of these pieces to produce a mold in which the blocks to be molded and like the pattern may be formed.

If desired the outer surfaces of the mold 12, at which it is desired the fracturing stresses be applied, may be indented or grooved in the operation of forming the mold, these indentations or grooves, if desired, extending the full length of all of the strips 7.

In Fig. 2 I have shown means for forming such indentations or grooves, represented at 13, along the strips 7 at the under edges of the face portion 5 and which is typical of the means which may be provided adjacent the others of the strips 7.

The means just referred to are in the form of strips 14 shown as secured in slots 15 in the wall portions of the mold frame 10 and projecting inwardly therefrom into the mold cavity 11 provided by this frame, in a substantially horizontal direction adjacent the upper edges of the strips 7, it being understood that the strips 14 for the vertical strips 7 would be vertically positioned in the frame 10 and extend substantially vertically in the same relative positions to these strips as the relationship shown in Fig. 2 between the strips 7 and 14.

It will be understood from the foregoing that when fracturing stresses are applied at the grooves 13, formed by the strips 14, the mold 12 will crack in a direction toward, and to, the outer edges of the strips 7 and the cracks will then follow inwardly along these strips and through the inner surface of the mold.

While the strips 7 are shown in such a position that they extend through the corners of the mold cavity, it will be understood that if desired these strips may be set back from the corners in which case the inner surface of the mold will be continuous at the corners of the mold cavity, as distinguished from containing the narrow slits formed by providing the strips 7 on the pattern. In such modified structure, the strips 7 would be located sufficiently close to the corners of the mold cavity that the material of the mold would crack at lines substantially in registration with the apices of the corners of the mold cavity.

Referring to Fig. 3, which represents my invention applied to the manufacture of cylindrical shaped blocks for assembly to form columns, a pattern corresponding to the block to be formed is represented at 16, the pattern being surrounded by a circular mold member 17 and corresponding to the mold frame 10 to provide between it and the pattern 16 a circular mold space 18 in which the mold of comparatively fragile material, as for example plaster of Paris, and represented at 19, is to be formed.

The mold 19 may be formed as described of the mold of Fig. 2, the pattern 16 and the mold ring 17 being placed upon a table and the material of which the mold 19 is to be formed, poured into the mold space 18, the mold 19 produced thereby containing the mold cavity 20.

The mold 19 is formed with weakening lines along which the mold separates into sections upon applying fracturing stresses thereto, the means shown in this arrangement for this purpose being in the form of strips 21 like the strips 7 radiating outwardly from the periphery of the pattern 16 to become embedded at their outer edge portions in the inner surface of the mold cavity 20. For separating the mold 19 from the pattern 16 the operator applies fracturing stresses to the mold 19 from the exterior of the latter adjacent the strips 21, as by means of a chisel, the mold 19 fracturing toward, and to, the strips 21, the mold sections thus produced being separated from each other at the strips 21. Upon reassembling the mold sections an article of the form of the pattern 16 may be molded therein.

The strips 21 in the case of this construction, as in the case of that shown in the preceding figures, need not penetrate the inner surface of the mold cavity 20 but may be so positioned as to be confined between the inner and outer walls of the mold 19 in which case they would function as explained of the modification of the positioning of the strips 7 of Fig. 2, to define the lines along which the mold would crack at its inner surface.

Of course, it will be understood that if desired grooves may be formed in the outer surface of the mold 19 generally as explained of the construction shown in Fig. 2 in which case, however, the groove-forming strips would preferably be aligned radially with the strips 21 but spaced radially from the latter.

While I have described my invention as employing the use of elements at which the mold is relatively weakened and determining the lines along which the mold will fracture, when fracturing stress is applied thereto, it will be understood the invention is not limited thereto as the weakening of the mold to determine the lines along which it separates, into sections, at its inner surface may be effected in other ways, within the spirit of my invention.

What I claim as new, and desire to secure by Letters Patent, is:

1. In the art of molding, the improvement which consists in casting mold-forming, settable, relatively fragile, material about a pattern to form a mold from which the pattern cannot be removed without breaking the mold, producing a weakening of the portion of the mold adjacent to which it is desired the mold fracture in separating it from the pattern and subjecting the mold to fracturing stresses adjacent the said weakened portion of the mold structure.

2. In the art of molding, the improvement which consists in casting mold-forming settable, relatively fragile, material about a pattern to form a mold from which the pattern cannot be removed without breaking the mold, producing in the casting of the mold a weakening of the portion of the mold adjacent to which it is desired the mold fracture in separating it from the pattern and subjecting the mold to fracturing stresses adjacent the said weakened portion of the mold structure.

3. In the art of molding, the improvement which consists in casting mold-forming settable, relatively fragile, material, about a pattern to form a mold from which the pattern cannot be removed without breaking the mold, producing a weakening of the mold structure at the portions thereof adjacent to which it is desired the mold structure be fractured and subjecting the mold to fracturing stresses adjacent said portions of the mold structure.

4. In the art of molding, the improvement which consists in casting mold-forming, settable, relatively fragile, material about a pattern to form a mold from which the pattern cannot be removed without breaking the mold, producing a weakening of the portion of the mold adjacent to which it is desired the mold fracture in separating it from the pattern, subjecting the mold to fracturing stresses adjacent the said weakened portion of the mold structure to break the mold structure into sections, and thereafter reassembling the sections into mold-forming condition.

5. In the art of molding, the improvement which consists in casting mold-forming settable, relatively fragile, material about a pattern to form a mold from which the pattern cannot be removed without breaking the mold, producing in the casting of the mold a weakening of the portion of the mold adjacent to which it is desired the mold fracture in separating it from the pattern, subjecting the mold to fracturing stresses adjacent the said weakened portion of the mold structure to break the mold structure into sections, and thereafter reassembling the sections into mold-forming condition.

6. In the art of molding, the improvement which consists in casting mold-forming settable, relatively fragile, material, about a pattern to form a mold from which the pattern cannot be removed without breaking the mold, producing a weakening of the mold structure at the portions thereof adjacent to which it is desired the mold structure be fractured, subjecting the mold to fracturing stresses adjacent said portions of the mold structure to break the mold structure into sections, and thereafter reassembling the sections into mold-forming condition.

MAJOR E. GATES.